United States Patent
Zhang et al.

(10) Patent No.: US 9,971,357 B2
(45) Date of Patent: May 15, 2018

(54) PARALLEL PLATFORM TRACKING CONTROL APPARATUS USING VISUAL DEVICE AS SENSOR AND CONTROL METHOD THEREOF

(71) Applicant: SOUTH CHINA UNIVERSITY OF TECHNOLOGY, Guangdong (CN)

(72) Inventors: Xianmin Zhang, Guangdong (CN); Jiasi Mo, Guangdong (CN); Zhicheng Qiu, Guangdong (CN); Junyang Wei, Guangdong (CN); Hai Li, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days. days.

(21) Appl. No.: 15/562,898

(22) PCT Filed: Dec. 23, 2015

(86) PCT No.: PCT/CN2015/098520
§ 371 (c)(1),
(2) Date: Sep. 29, 2017

(87) PCT Pub. No.: WO2016/165391
PCT Pub. Date: Oct. 20, 2016

(65) Prior Publication Data
US 2018/0081376 A1    Mar. 22, 2018

(30) Foreign Application Priority Data
Apr. 16, 2015  (CN) .......................... 2015 1 0182053

(51) Int. Cl.
*B64C 17/06*    (2006.01)
*G05B 19/25*    (2006.01)
(Continued)

(52) U.S. Cl.
CPC ............... *G05D 3/12* (2013.01); *G05B 13/04* (2013.01); *G06T 7/20* (2013.01); *H02K 41/02* (2013.01);
(Continued)

(58) Field of Classification Search
None
See application file for complete search history.

(56) References Cited

U.S. PATENT DOCUMENTS

2008/0309276 A1*  12/2008  Xu ....................... G05B 19/404
                                                        318/570

FOREIGN PATENT DOCUMENTS

CN    102339069    2/2012
CN    103292127    9/2013
(Continued)

*Primary Examiner* — Bentsu Ro
*Assistant Examiner* — Zemenay Truneh
(74) *Attorney, Agent, or Firm* — JCIPRNET

(57) ABSTRACT

A parallel platform tracking control apparatus and method using a visual device as a sensor are disclosed. The apparatus comprises a parallel platform body, a CCD camera (11), a lens (6), a camera light source (9), a computer (11), a Dspace semi-physical simulation controller, an ultrasonic motor driver and the like. The parallel platform comprises an ultrasonic linear motor (1), a linear grating encoder (5), a driven rod (2), a moving platform (3), a stationary platform (4) and the like. The CCD camera photographs the moving platform in a perpendicular and opposite manner, and the photographed images are subjected to an image processing algorithm to measure the position of the corresponding marker on the moving platform, which is not only applicable to measurement, but also implements real-time feedback of the termination position of the moving platform, such that a full closed-loop system is constituted. In this way, the parallel platform is precisely positioned.

5 Claims, 3 Drawing Sheets

(51) Int. Cl.
    *G05D 3/12*       (2006.01)
    *G05B 13/04*     (2006.01)
    *G06T 7/20*       (2017.01)
    *H02K 41/02*     (2006.01)
    *G05B 19/404*    (2006.01)

(52) U.S. Cl.
    CPC .. *G05B 19/404* (2013.01); *G06T 2207/20004* (2013.01); *G06T 2207/30204* (2013.01)

(56) References Cited

FOREIGN PATENT DOCUMENTS

| | | |
|---|---|---|
| CN | 103544714 | 1/2014 |
| CN | 104820439 | 8/2015 |
| CN | 204595620 | 8/2015 |
| JP | 2003207719 | 7/2003 |

\* cited by examiner

PARALLEL PLATFORM TRACKING CONTROL APPARATUS USING VISUAL DEVICE AS SENSOR AND CONTROL METHOD THEREOF

CROSS-REFERENCE TO RELATED APPLICATION

This application is a 371 application of the international PCT application serial no. PCT/CN2015/098520, filed on Dec. 23, 2015, which claims the priority benefit of China application no. 201510182053.4, filed on Apr. 16, 2015. The entirety of each of the above-mentioned patent applications is hereby incorporated by reference herein and made a part of this specification.

TECHNICAL FIELD

The present invention relates to position measurement and tracking control of planar parallel platforms, and in particular, relates to a parallel platform tracking control apparatus using a visual device as a sensor and control method thereof.

BACKGROUND

The precision positioning platform is an important part in the fields of precision operation, precision manufacturing and precision measurement. A traditional precision positioning platform is generally composed of a pizeoceramic driven compliant mechanism, which has the advantages of high precision and short response time. However, the defect of inherited short stroke restricts the application scope of the platform. At present, technology developments promote more and more cross-scale application scenarios, and thus great stroke and high precision become issues to be urgently addressed for further developments of the precision positioning. A macro-and-micro-combined method is proposed to achieve the objective of the great stroke. The macro-and-micro-combined method is to place a micro-moving platform to a macro-moving platform, conducting coarse positioning by using the great-stroke macro-moving platform, and then achieving precision positioning by using the micro-moving platform. To achieve this object, the positioning precision of the macro-moving platform needs to fall within the working space of the micro-moving platform, which imposes a high requirement on the positioning precision of the macro-moving platform. Due to lack of a suitable sensor, the traditional parallel platforms are all semi-closed loop positioning platforms, that is, the platforms having only joint closed-loop. In practical application, the manufacturing error, assembling error, joint gap, friction, elastic deformation and the like uncertain factors are present. As such, although the joint of the parallel platform may be precisely positioned, after the joint is transferred to the termination of the platform, various errors as described above may be caused. Therefore, precise positioning needs to be ensured at the termination in addition to precise positioning at the joint.

At present, no sensor that is capable of measuring plane 3 degree-of-freedom (two translations and one rotation) can be used for termination feedback of the planar parallel platform. To precisely measure the error of the plane 3 degree-of-freedom, three single degree-of-freedom sensors may be used, for example, laser displacement sensors. With specific arrangement, upon measurement, the position and gesture angle error of the platform is calculated, which, definitely, increases the volume of the entire mechanism, such that the mechanism may not be applicable to the size-limited scenarios such as the scanning electron microscope cavity.

SUMMARY OF THE INVENTION

The present invention is intended to provide a parallel platform tracking control apparatus using a visual device as a sensor and control method thereof, to overcome the problem and defect that a planar parallel mechanism has no suitable plane 3 degree-of-freedom measurement sensor. According to the present invention, a CCD camera-based visual measurement system, in cooperation with a position tracking feedback control apparatus, is used as a sensor, which not only solves the problem of plane 3 degree-of-freedom measurement using the image processing and measurement method, but also implements real-time feedback of termination position and gesture angle, thereby implementing full closed-loop control of the parallel platform and creating great significance for improvement of the termination precision of a planar parallel positioning platform. In addition, the CCD camera-based visual measurement device only needs a CCD camera, a lens, a light source and the like. Such a measurement device has a simple structure and a small size, and is thus applicable to be integrated in a small-sized space. According to the present invention, a moving platform reaches a submicron-class positioning precision under a millimeter-class stroke.

The Present Invention is Practiced Using the Following Technical Solutions

A parallel platform tracking control apparatus using a visual device as a sensor is provided. The apparatus comprises: a parallel platform mechanism, a CCD camera-based visual measurement system, a position tracking feedback control apparatus;

the parallel platform mechanism comprises: a stationary platform 4, a moving platform 3 arranged above the stationary platform 4, three ultrasonic linear motors 1, an ultrasonic linear motor driver; wherein the moving platform 3 has three rotary shafts distributed uniformly in equilateral triangle at an outer edge of the moving platform 3; the three ultrasonic linear motors 1 are distributed and mounted in equilateral triangle at an edge of the stationary platform 4; shaft ends of the rotation shafts 10 installed on the ultrasonic linear motors 1 are connected to one of the rotary shafts of the moving platform 3 via a driven rod 2; and the ultrasonic linear motors 1 are each provided with a linear grating encoder 5;

one ultrasonic linear motor 1, one driven rod 2 and one rotary shaft of the moving platform 3 constitute a parallel branch;

the three ultrasonic linear motors 1 collaboratively drive the driven rod 2, such that the moving platform 3 moves to a target position;

the ultrasonic linear motors 1, during movement, drives the linear grating encoder 5 to move, to detect actual positions of the motors 1;

a first point light source marker 8-1 and a second point light source marker 8-2 that are linearly distributed and configured to focus blue laser are mounted on the moving platform 3 as visual detection features;

the CCD camera-based visual measurement system comprises: a CCD camera 11 arranged above the moving platform 3, a lens 6 mounted on an end portion of the CCD camera 11, a camera light source 9 arranged on a side of the lens 6, a USB interface and a computer; wherein the CCD camera 11 is connected to the computer via the USB interface;

the lens 6 is perpendicular and opposite to the moving platform 3, such that a central point of the lens 6 coincides with an origin point of the moving platform 3;

the position tacking feedback control apparatus comprises a Dspace semi-physical simulation controller having an incremental encoder interface module and a D/AC interface; the D/AC interface is connected to the ultrasonic linear motor driver, each of the linear grating encoders 5 is connected to the incremental encoder interface module, the incremental encoder interface module is connected to the computer, and the computer is connected to the D/AC interface.

The CCD camera 11 further comprises a support mechanism, wherein the support mechanism comprises a bracket 7 having a movable joint and a magnetic base 12 configured to fix the bracket 7, and the CCD camera 11 is fixed to an end portion of the bracket 7.

A control method of the parallel platform tracking control apparatus using a visual device as a sensor comprises the following steps:

(I) A CCD Camera-Based Visual Measurement Step acquiring an image signal of a moving platform 3 via photographing by the CCD camera 11, and transmitting the image signal to the computer via the USB interface;

upon acquiring the image signal, performing image processing by the computer, extracting features of the first point light source marker 8-1 and the second point light source marker 8-2 on the moving platform 3, and obtaining coordinates via calculation;

calculating parallel displacements $\Delta x$ and $\Delta y$ and a rotation angle $\Delta \theta$ of the moving platform 3 according to the coordinates of the first point light source marker 8-1 and the second point light source marker 8-2;

wherein the two parallel displacements $\Delta x$ and $\Delta y$ and the rotation angle $\Delta \theta$ of the moving platform (3) are calculated using the following formula:

assuming that a coordinate of the first point light source marker 8-1 before movement is $(x_1,y_1)$ and a coordinate of the first point light source marker 8-1 after movement is $(x_1',y_1')$, and a coordinate of the second point light source marker 8-2 before movement is $(x_2,y_2)$ and a coordinate of the second point light source marker 8-2 after movement is $(x_2',y_2')$, and assuming that the first point light source marker 8-1 and the second point light source marker 8-2 before movement constitute a vector $S=((x_2-x_1),(y_2-y_1))$, and the vector changes to $S'=((x_2'-x_1'),(y_2'-y_2'-y_1'))$ after movement;

the displacements of the moving platform 3 are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform 3 moves towards a positive direction of x-axis, and if $\Delta x$ is less than 0, the moving platform 3 moves towards a negative direction of x-axis; and if $\Delta y$ is greater than 0, the moving platform 3 moves towards a positive direction of y-axis, and if $\Delta y$ is less than 0, the moving platform 3 moves towards a negative direction of y-axis; and the rotation angle of the moving platform is $$\Delta \theta = \arccos \frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if $\Delta \theta$ is greater than 0, the moving platform 3 rotates clockwise; and if $\Delta \theta$ is less than 0, the moving platform 3 rotates counterclockwise;

(II) A Parallel Platform Position Tracking Measurement Feedback Control Step step 1: upon receiving a drive signal transmitted by the ultrasonic linear motor driver, causing, by an ultrasonic linear motor 1, the moving platform 3 to move to a target position using a driven rod 2, wherein the moving platform 3 has a position and gesture angle error;

step 2: driving, by the ultrasonic linear motor 1, the linear grating encoder 5 to detect an actual position of joint movement, and feeding back the detected actual position to the computer via the incremental encoder interface, wherein a subtraction is made between the actual position and an expected position to produce an error signal, a control signal is produced based on the error signal by means of a corresponding position control algorithm, the control signal outputs a direct-current control signal, via the D/AC interface, to the ultrasonic linear motor driver, whereupon the driver drives the motor such that the joint precisely moves to the expected position;

step 3: photographing by the CCD camera 11 within each sampling cycle, and transmitting the image signal to the computer via the USB interface, whereupon the computer performs corresponding image processing, acquires coordinate information of the photographed first point light source marker 8-1 and the photographed second point light source marker 8-2, and obtains the position and gesture angle error of the moving platform using the following formulae:

assuming that the coordinate of the first point light source marker 8-1 before movement is $(x_1,y_1)$ and the coordinate of the first point light source marker 8-1 after movement is $(x_1',y_1')$, and the coordinate of the second point light source marker 8-2 before movement is $(x_2,y_2)$ and the coordinate of the second point light source marker 8-2 after movement is $(x_2',y_2')$, and assuming that the first point light source marker 8-1 and the second point light source marker 8-2 before movement constitute a vector $S=((x_2-x_1),(y_2-y_1))$, and the vector changes to $S'=((x_2'-x_1'),(y_2'-y_1'))$ after movement;

the displacements of the moving platform 3 are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform 3 moves towards a positive direction of x-axis, and if $\Delta x$ is less than 0, the moving platform 3 moves towards a negative direction of x-axis; and if $\Delta y$ is greater than 0, the moving platform 3 moves towards a positive direction of y-axis, and if $\Delta y$ is less than 0, the moving platform 3 moves towards a negative direction of y-axis;

the rotation angle of the moving platform is $$\Delta \theta = \arccos \frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if $\Delta \theta$ is greater than 0, the moving platform 3 rotates clockwise; and if $\Delta \theta$ is less than 0, the moving platform 3 rotates counterclockwise;

step 4: after the computer obtains the position and gesture angle error of the moving platform 3 via calculation, rectifying a joint driving amount, wherein a joint control signal upon rectification outputs a direct-current control signal, via the D/AC interface, to the ultrasonic linear motor driver, whereupon the driver drives the motor such that the moving platform 3 precisely moves to the expected position;

(III) Moving Platform Position and Gesture Angle Error Calculation Step step 1: subjecting an image to a binarization to obtain border and region information of the first point light source marker 8-1 and the second point light source marker 8-2;

step 2: obtaining x,y coordinates of the binary image signal using the mass center method by means of the following formula:

a binary bounded image function $f(x,y)$, wherein the j+k order moment is $$M_{jk} = \int_{-\infty}^{+\infty} \int_{-\infty}^{+\infty} x^j y^k f(x, y) dx dy, (j, k = 0, 1, 2 \ldots);$$

since quality distribution of the binary image is uniform, the centriod coincides with the mass center; and if a pixel position coordinate of an object in the image is $$(x_i + y_j)(i = 0, 1, \ldots n-1; j = 0, 1, \ldots m-1), x = \frac{M_{10}}{M_{00}}, y = \frac{M_{01}}{M_{00}};$$

step 3: after the coordinate information of the photographed first point light source marker 8-1 and the photographed second point light source marker 8-2 is acquired, calculating the position and gesture angle error of the moving platform using the following formulae:

assuming that the coordinate of the first point light source marker 8-1 before movement is $(x_1,y_1)$ and the coordinate of the first point light source marker 8-1 after movement is $(x_1',y_1')$, and the coordinate of the second point light source marker 8-2 before movement is $(x_2,y_2)$ and the coordinate of the second point light source marker 8-2 after movement is $(x_2',y_2')$, and assuming that the first point light source marker 8-1 and the second point light source marker 8-2 before movement constitute the vector $S=((x_2-x_1),(y_2-y_1))$, and the vector changes to $S'=((x_2'-x_1'),(y_2'-y_2'-y_1'))$ after movement;

the displacements of the moving platform 3 are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform 3 moves towards a positive direction of x-axis, and if $\Delta x$ is less than 0, the moving platform 3 moves towards a negative direction of x-axis; and if $\Delta y$ is greater than 0, the moving platform 3 moves towards a positive direction of y-axis, and if $\Delta y$ is less than 0, the moving platform 3 moves towards a negative direction of y-axis; and the rotation angle of the moving platform is $$\Delta \theta = \arccos \frac{S \cdot S'}{|S|^2};$$

wherein $S \cdot S'=(x_2-x_1)(x_2'-x_1')+(y_2-y_1)(y_2'-y_1')$ and $|S|^2=(x_2-x_1)^2+(y_2-y_1)^2$; if $\Delta \theta$ is greater than 0, the moving platform 3 rotates clockwise; and if $\Delta \theta$ is less than 0, the moving platform 3 rotates counterclockwise;

step 4: after a gesture angle is calculated using a second-order central moment according to the feature that the moment is not changed, averaging the calculated gesture angle with the gesture angle calculated in step 3, rectifying the gesture angle error, and image-processing and calculating the gesture angle using the following formula:

the central moment is defined as $$M'_{jk} = \sum_{x=1}^{N} \sum_{y=1}^{M} (x - \bar{x})^j (y - \bar{y})^k f(x, y),$$

and a rotation angle causing the central moment M'11 to become the smallest is $$\theta = \frac{1}{2} \arctan \left( \frac{2M'_{11}}{M'_{20} - M'_{02}} \right).$$

The control method further comprises a linear grating encode joint position feedback step and a CCD camera-based visual measurement termination feedback step;

CCD Camera-Based Visual Measurement Termination Feedback Step photographing by the CCD camera-based visual measurement system within each sampling cycle, and transmitting image signals to the computer via the USB interface, whereupon the computer performs corresponding image processing, acquires coordinates information of the photographed first point light source marker 8-1 and second point light source marker 8-2, and calculates the position and gesture angle error of the moving platform using the following formulae:

assuming that a coordinate of the first point light source marker 8-1 before movement is $(x_1,y_1)$ and a coordinate of the first point light source marker 8-1 after movement is $(x_1',y_1')$, and a coordinate of the second point light source marker 8-2 before movement is $(x_2,y_2)$ and a coordinate of the second point light source marker 8-2 after movement is $(x_2',y_2')$, and assuming that the first point light source marker 8-1 and the second point light source marker 8-2 before movement constitute a vector $S=((x_2-x_1),(y_2-y_1))$, and the vector changes to $S'=((x_2'-x_1'),(y_2'-y_2'-y_1'))$ after movement;

the displacements of the moving platform 3 are $$\Delta x = \frac{(x_2 - x_1) - (x_2' - x_1')}{2},$$

$$\Delta y = \frac{(y_2 - y_1) - (y_2' - y_1')}{2};$$

wherein if $\Delta x$ is greater than 0, the moving platform 3 moves towards a positive direction of x-axis, and if $\Delta x$ is less than 0, the moving platform 3 moves towards a negative direction of x-axis; and if $\Delta y$ is greater than 0, the moving platform 3 moves towards a positive direction of y-axis, and if $\Delta y$ is less than 0, the moving platform 3 moves towards a negative direction of y-axis; and the rotation angle of the moving platform is $$\Delta \theta = \arccos \frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if $\Delta\theta$ is greater than 0, the moving platform 3 rotates clockwise; and if $\Delta\theta$ is less than 0, the moving platform 3 rotates counterclockwise;

Linear Grating Encoder Joint Position Feedback Step driving the linear grating encoder by the ultrasonic linear motor, feeding back the measured actual position to the computer via an incremental encoder interface of a Dspace semi-physical simulation controller, executing a joint positioning control algorithm by the computer to generate a joint control drive signal, outputting a direct-current control signal via a D/AC interface of the Dspace semi-physical simulation controller to a driver of the ultrasonic linear motor to drive the motor such that the joint moves to the expected position.

According to the present invention, a CCD camera-based visual measurement system, in cooperation with a position tracking feedback control apparatus, is used as a sensor, which achieves at least the following advantages and beneficial effects:

Detection of the termination position and gesture angle error of the moving platform by the sensor is a non-contact measurement. The mechanism is small and compact, without adding any other weight to the structure and changing the structure feature, and has the advantages of high measurement precision, high sampling frequency and quick dynamic response.

The apparatus is simply integrated into a scenario having the visual device, for example, in a cavity of scanning electron microscope (SEM).

Photographing is carried out by using a point light source marker in combination with a camera light source (an LED shadowless lamp), and the imaging effect is good, which simplifies image processing difficulty and improves image processing speed.

The position tracking feedback control apparatus is a double closed-loop apparatus, which not only has a driving joint closed-loop, but also has a termination closed-loop, and thus remarkably improves the positioning precision of the termination of the platform.

The CCD camera-based visual measurement device is used as a sensor in the non-contact measurement. The mechanism is small and compact, without adding any other weight to the structure and changing the structure feature, and has the advantages of high measurement precision, high sampling frequency and quick dynamic response. In addition, two translational degree-of-freedoms and one rotary degree-of-freedom may be simultaneously measured.

The CCD camera photographs the moving platform in a perpendicular and opposite manner, and the photographed images are subjected to an image processing algorithm to measure the position of the corresponding marker on the moving platform, which is not only applicable to measurement, but also implements real-time feedback of the termination position of the moving platform, such that a full closed-loop system is constituted. A high-speed and high-resolution CCD camera is used to implement pixel-based positioning during the course of dynamic tracking, and implement subpixel-based positioning when a static point is stabilized, thereby achieving the objective of precisely tracking the parallel platform.

DETAILED DESCRIPTION OF THE PREFERRED EMBODIMENT

The present invention is further described with reference to specific embodiments.

Embodiments

Figure 1:
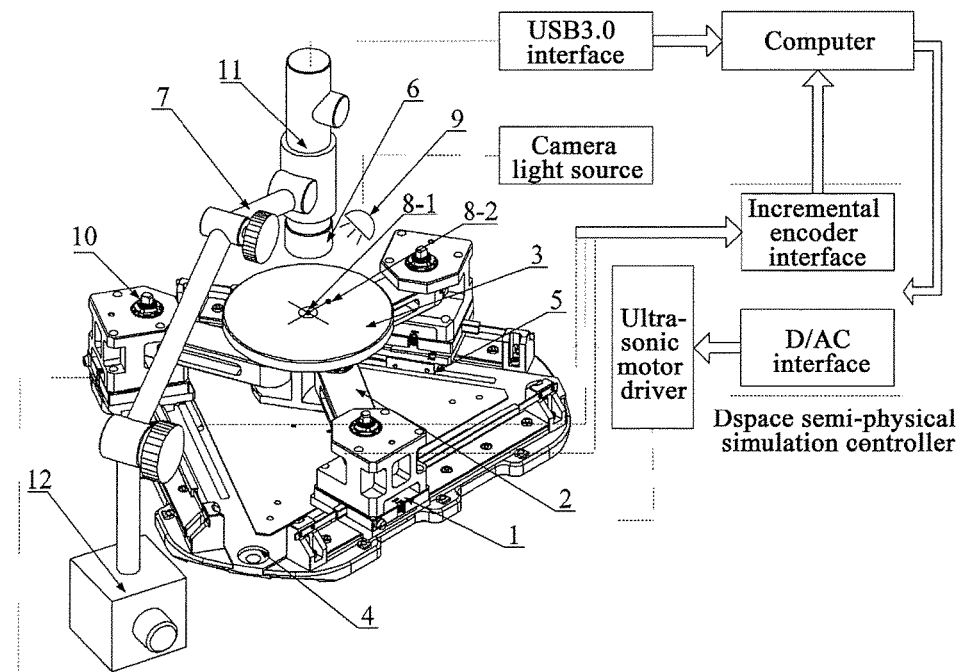
FIG. 1 is an overall schematic structural view of a parallel platform tracking control apparatus using a visual device as a sensor according to the present invention, wherein the dotted lines indicate signal connections.
Figure 2:
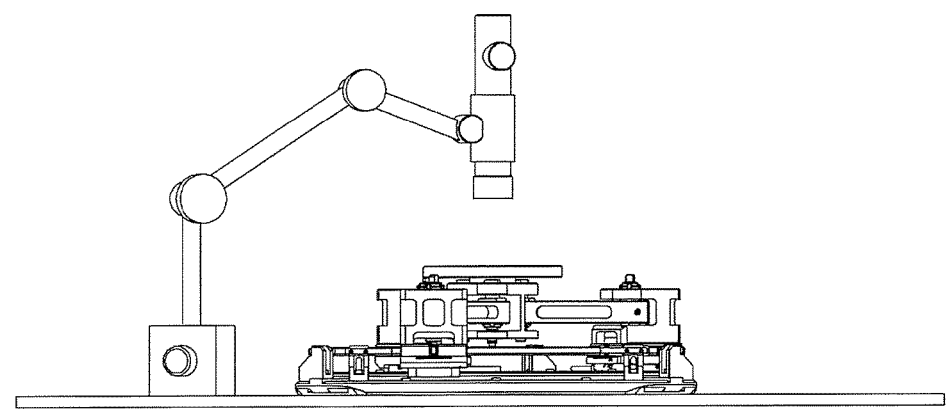
FIG. 2 is a front view of FIG. 11.
Figure 3:
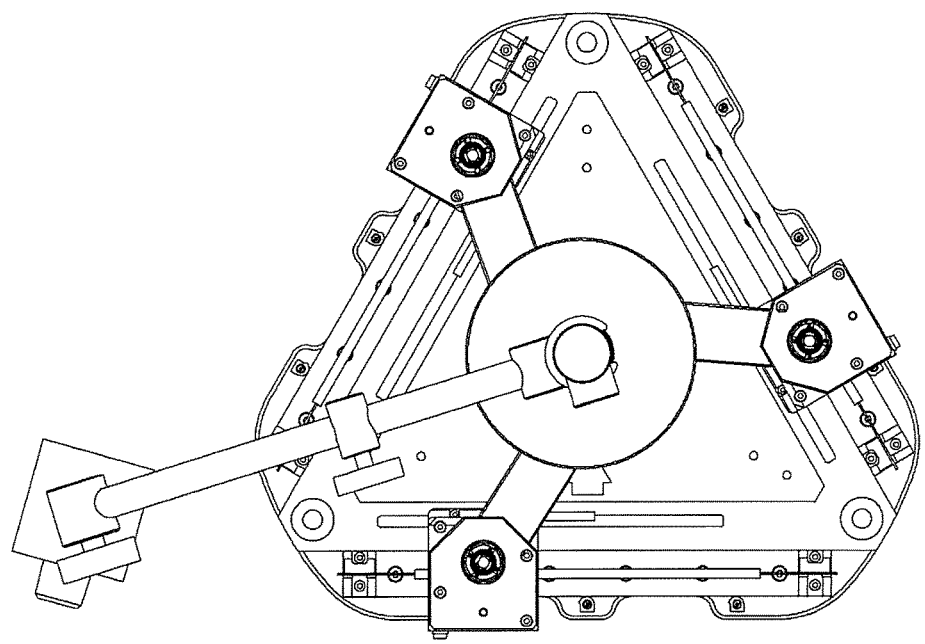
FIG. 3 is a top view of FIG. 1.
Figure 4:
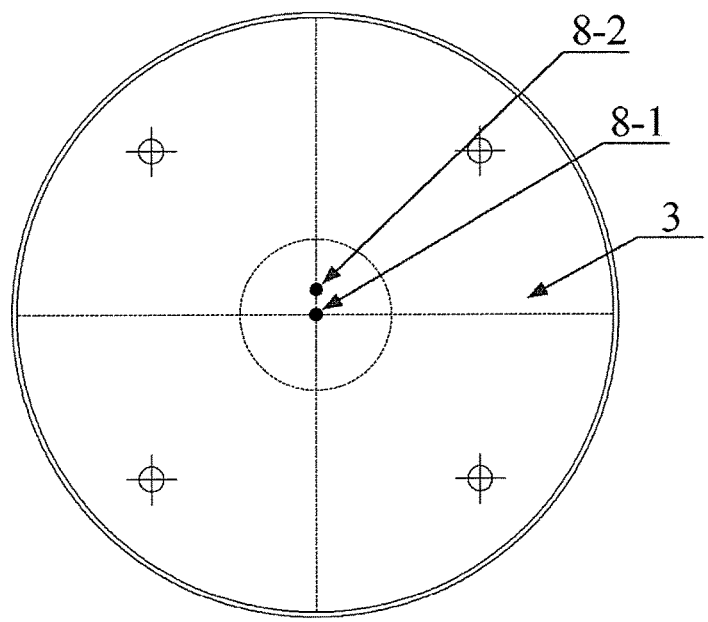
FIG. 4 illustrates linear distribution of a first point light source marker 8-1 and a second point light source marker 8-2 of a moving platform in a field of view of a CCD camera.
Figure 5:
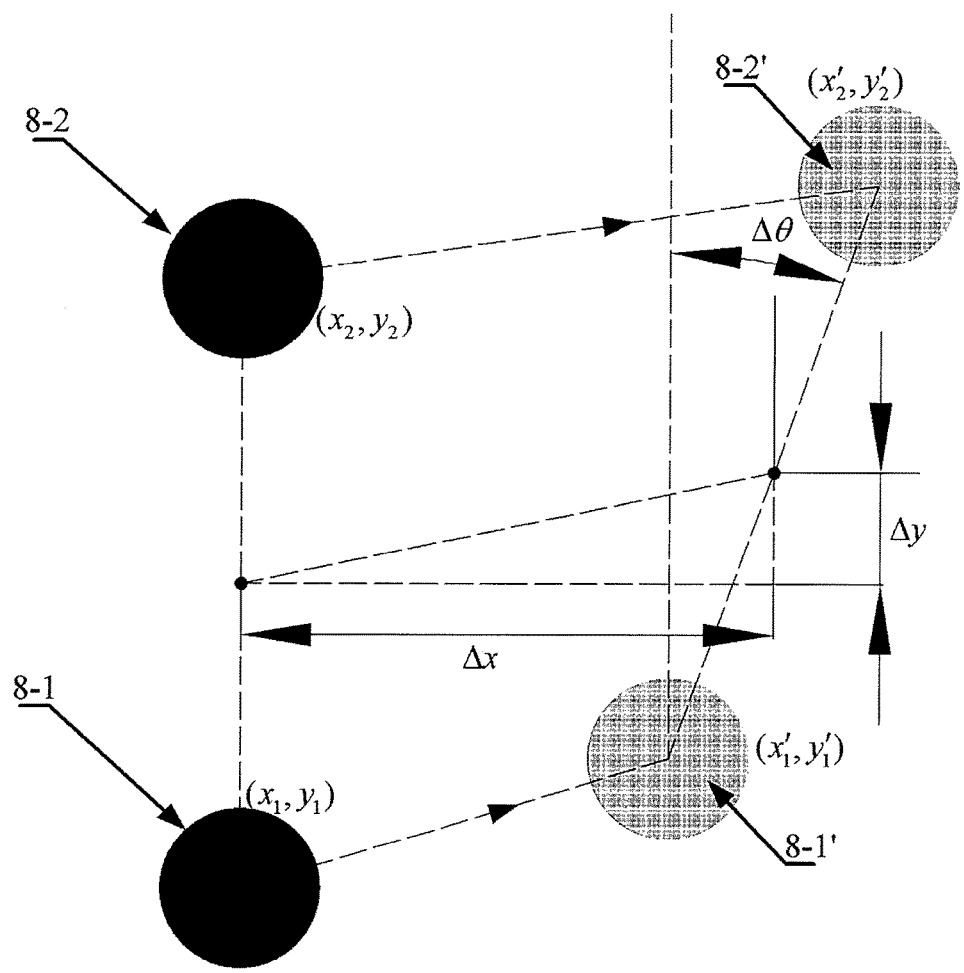
FIG. 5 is a schematic view illustrating position changes of the first point light source marker 8-1 and the second point light source marker 8-2 before and after movement.

As illustrated in FIG. 1 to FIG. 5, the present invention provides a parallel platform tracking control apparatus using a visual device as a sensor is provided. The apparatus comprises: a parallel platform mechanism, a CCD camera-based visual measurement system, a position tracking feedback control apparatus; wherein the parallel platform mechanism comprises: a stationary platform 4, a moving platform 3 arranged above the stationary platform 4, three ultrasonic linear motors 1, an ultrasonic linear motor driver; wherein the moving platform 3 has three rotary shafts distributed uniformly in equilateral triangle at an outer edge of the moving platform 3; the three ultrasonic linear motors 1 are distributed and mounted in equilateral triangle at an edge of the stationary platform 4; shaft ends of the rotation shafts 10 installed on the ultrasonic linear motors 1 are connected to one of the rotary shafts of the moving platform 3 via a driven rod 2; and the ultrasonic linear motors 1 are each provided with a linear grating encoder 5;

one ultrasonic linear motor 1, one driven rod 2 and one rotary shaft of the moving platform 3 constitute a parallel branch; wherein totally three parallel branches are constituted;

the three ultrasonic linear motors 1 collaboratively drive the driven rod 2, such that the moving platform 3 moves to a target position;

the ultrasonic linear motors 1, during movement, drives the linear grating encoder 5 to move, to detect actual positions of the motors 1;

a first point light source marker 8-1 and a second point light source marker 8-2 that are linearly distributed and configured to focus blue laser are mounted on the moving platform 3 as visual detection features;

the CCD camera-based visual measurement system comprises: a CCD camera 11 arranged above the moving platform 3, a lens 6 mounted on an end portion of the CCD camera 11, a camera light source 9 arranged on a side of the lens 6, a USB interface and a computer; wherein the CCD camera 11 is connected to the computer via the USB3.0 interface;

the lens 6 is perpendicular and opposite to the moving platform 3, such that a central point of the lens 6 coincides with the origin point of the moving platform 3; and the position tacking feedback control apparatus comprises a Dspace semi-physical simulation controller having an incremental encoder interface module and a D/AC interface; wherein the D/AC interface is connected to the ultrasonic linear motor driver, each of the linear grating encoders 5 is connected to the incremental encoder interface module, the incremental encoder interface module is connected to the computer, and the computer is connected to the D/AC interface; wherein the Dspace semi-physical simulation controller is a Dspace DS 1103 semi-physical simulation controller.

The CCD camera 11 further comprises a support mechanism, wherein the support mechanism comprises a bracket 7 having a movable joint and a magnetic base 12 configured to fix the bracket 7, and the CCD camera 11 is fixed to an end portion of the bracket 7.

A control method of the parallel platform tracking control apparatus using a visual device as a sensor comprises the following steps:

(I) A CCD Camera-Based Visual Measurement Step acquiring an image signal of a moving platform 3 via photographing by a CCD camera 11, and transmitting the image signal to a computer via a USB interface;

upon acquiring the image signal, performing image processing by the computer, extracting features of a first point light source marker 8-1 and a second point light source marker 8-2 on the moving platform 3, and obtaining coordinates via calculation;

calculating parallel displacements $\Delta x$ and $\Delta y$ and a rotation angle $\Delta \theta$ of the moving platform 3 according to the coordinates of the first point light source marker 8-1 and the second point light source marker 8-2;

wherein the two parallel displacements $\Delta x$ and $\Delta y$ and the rotation angle $\Delta \theta$ of the moving platform (3) are calculated using the following formula:

assuming that a coordinate of the first point light source marker 8-1 before movement is $(x_1,y_1)$ and a coordinate of the first point light source marker 8-1 after movement is $(x_1',y_1')$, and a coordinate of the second point light source marker 8-2 before movement is $(x_2,y_2)$ and a coordinate of the second point light source marker 8-2 after movement is $(x_2',y_2')$, and assuming that the first point light source marker 8-1 and the second point light source marker 8-2 before movement constitute a vector $S=((x_2-x_1),(y_2-y_1))$, and the vector changes to $S'=((x_2'-x_1'),(y_2'-y_2'-y_1'))$ after movement;

the displacements of the moving platform 3 are $$\Delta x = \frac{(x_2 - x_1) - (x_2' - x_1')}{2},$$

$$\Delta y = \frac{(y_2 - y_1) - (y_2' - y_1')}{2};$$

wherein if $\Delta x$ is greater than 0, the moving platform 3 moves towards a positive direction of x-axis, and if $\Delta x$ is less than 0, the moving platform 3 moves towards a negative direction of x-axis; and if $\Delta y$ is greater than 0, the moving platform 3 moves towards a positive direction of y-axis, and if $\Delta y$ is less than 0, the moving platform 3 moves towards a negative direction of y-axis; and the rotation angle of the moving platform is $$\Delta \theta = \arccos \frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if $\Delta \theta$ is greater than 0, the moving platform 3 rotates clockwise; and if $\Delta \theta$ is less than 0, the moving platform 3 rotates counterclockwise;

(II) A Parallel Platform Position Tracking Measurement Feedback Control Step step 1: upon receiving a drive signal transmitted by an ultrasonic linear motor driver, causing, by an ultrasonic linear motor 1, the moving platform 3 to move to a target position using a driven rod 2, wherein the moving platform 3 has a position and gesture angle error;

step 2: driving, by the ultrasonic linear motor 1, a linear grating encoder 5 to detect an actual position of joint movement, and feeding back the detected actual position to a computer via an incremental encoder interface, wherein a subtraction is made between the actual position and an expected position to produce an error signal, a control signal is produced based on the error signal by means of a corresponding position control algorithm, the control signal outputs a direct-current control signal, via a D/AC interface, to the ultrasonic linear motor driver (the driver generates a 160 KHz alternating-current high voltage), whereupon the driver drives the motor such that the joint precisely moves to the expected position;

step 3: photographing by the CCD camera 11 within each sampling cycle, and transmitting image signals to the computer via the USB interface, whereupon the computer performs corresponding image processing, acquires coordinate information of the photographed first point light source marker 8-1 and second point light source marker 8-2, and obtains the position and gesture angle error of the moving platform using the following formulae:

assuming that a coordinate of the first point light source marker 8-1 before movement is $(x_1,y_1)$ and a coordinate of the first point light source marker 8-1 after movement is $(x_1',y_1')$, and a coordinate of the second point light source marker 8-2 before movement is $(x_2,y_2)$ and a coordinate of the second point light source marker 8-2 after movement is $(x_2',y_2')$, and assuming that the first point light source marker 8-1 and the second point light source marker 8-2 before movement constitute a vector $S=((x_2-x_1),(y_2-y_1))$, and the vector changes to $S'=((x_2'-x_1'),(y_2'-y_2'-y_1'))$ after movement;

the displacements of the moving platform 3 are $$\Delta x = \frac{(x_2 - x_1) - (x_2' - x_1')}{2},$$

$$\Delta y = \frac{(y_2 - y_1) - (y_2' - y_1')}{2};$$

wherein if $\Delta x$ is greater than 0, the moving platform 3 moves towards a positive direction of x-axis, and if $\Delta x$ is less than 0, the moving platform 3 moves towards a negative direction of x-axis; and if $\Delta y$ is greater than 0, the moving platform 3 moves towards a positive direction of y-axis, and if $\Delta y$ is less than 0, the moving platform 3 moves towards a negative direction of y-axis; and the rotation angle of the moving platform is $$\Delta \theta = \arccos \frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if $\Delta \theta$ is greater than 0, the moving platform 3 rotates clockwise; and if Δθ is less than 0, the moving platform 3 rotates counterclockwise;

step 4: after the computer obtains the position and gesture angle error of the moving platform 3 via calculation, rectifying a joint driving amount, wherein a joint control signal upon rectification outputs the direct-current control signal, via the D/AC interface, to the ultrasonic linear motor driver, whereupon the driver drives the motor such that the moving platform 3 precisely moves to the expected position;

(III) A Moving Platform Position and Gesture Angle Error Calculation Step step 1: subjecting an image to an optimal threshold segmentation to obtain a binary image;

step 2: subjecting the binary image to a connected region analysis, identifying the first point light source marker 8-1 and the second point light source marker 8-2 according to an area feature of the connected region, and excluding interference from a small-area connected region;

step 3: obtaining a centroid coordinate of a connected region where the first point light source marker and the second point light source marker are located based on the Moment method using the following formula:

a binary bounded image function $f(x,y)$, wherein the j+k order moment is $$M_{jk} = \int_{-\infty}^{+\infty}\int_{-\infty}^{+\infty} x^j y^k f(x,y)dxdy, (j, k = 0, 1, 2, \ldots );$$

since quality distribution of the binary image is uniform, the centriod coincides with the mass center; and if a pixel position coordinate of an object in the image is $$(x_i + y_j)(i = 0, 1, \ldots n-1; j = 0, 1, \ldots m-1),$$

$$x = \frac{M_{10}}{M_{00}}, y = \frac{M_{01}}{M_{00}};$$

therefore, the corresponding centroid coordinate may be obtained by performing mass center calculation for the connected region where the two markers are located;

step 4: after the coordinate information of the photographed first point light source marker 8-1 and the photographed second point light source marker 8-2 is acquired, calculating the position and gesture angle error of the moving platform using the following formulae:

assuming that the coordinate of the first point light source marker 8-1 before movement is $(x_1,y_1)$ and the coordinate of the first point light source marker 8-1 after movement is $(x_1',y_1')$, and the coordinate of the second point light source marker 8-2 before movement is $(x_2,y_2)$ and the coordinate of the second point light source marker 8-2 after movement is $(x_2',y_2')$, and assuming that the first point light source marker 8-1 and the second point light source marker 8-2 before movement constitute the vector $S=((x_2-x_1),(y_2-y_1))$, and the vector changes to $S'=((x_2'-x_1'),(y_2'-y_1'))$ after movement;

the displacements of the moving platform (3) are $$\Delta x = \frac{(x_2 - x_1) - (x_2' - x_1')}{2},$$

$$\Delta y = \frac{(y_2 - y_1) - (y_2' - y_1')}{2};$$

wherein if Δx is greater than 0, the moving platform 3 moves towards a positive direction of x-axis, and if Δx is less than 0, the moving platform 3 moves towards a negative direction of x-axis; and if Δy is greater than 0, the moving platform 3 moves towards a positive direction of y-axis, and if Δy is less than 0, the moving platform 3 moves towards a negative direction of y-axis; and the rotation angle of the moving platform is $$\Delta\theta = \arccos\frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if Δθ is greater than 0, the moving platform 3 rotates clockwise; and if Δθ is less than 0, the moving platform 3 rotates counterclockwise;

The control method further comprises a linear grating encode joint position feedback step and a CCD camera-based visual measurement termination feedback step;

CCD Camera-Based Visual Measurement Termination Feedback Step photographing by the CCD camera-based visual measurement system within each sampling cycle, and transmitting image signals to the computer via the USB interface, whereupon the computer performs corresponding image processing, acquires coordinates information of the photographed first point light source marker 8-1 and second point light source marker 8-2, and calculates the position and gesture angle error of the moving platform using the following formulae:

assuming that a coordinate of the first point light source marker 8-1 before movement is $(x_1,y_1)$ and a coordinate of the first point light source marker 8-1 after movement is $(x_1',y_1')$, and a coordinate of the second point light source marker 8-2 before movement is $(x_2,y_2)$ and a coordinate of the second point light source marker 8-2 after movement is $(x_2',y_2')$, and assuming that the first point light source marker 8-1 and the second point light source marker 8-2 before movement constitute a vector $S=((x_2-x_1),(y_2-y_1))$, and the vector changes to $S'=((x_2'-x_1'),(y_2'-y_2'-y_1'))$ after movement;

the displacements of the moving platform 3 are $$\Delta x = \frac{(x_2 - x_1) - (x_2' - x_1')}{2},$$

$$\Delta y = \frac{(y_2 - y_1) - (y_2' - y_1')}{2};$$

wherein if Δx is greater than 0, the moving platform 3 moves towards a positive direction of x-axis, and if Δx is less than 0, the moving platform 3 moves towards a negative direction of x-axis; and if Δy is greater than 0, the moving platform 3 moves towards a positive direction of y-axis, and if Δy is less than 0, the moving platform 3 moves towards a negative direction of y-axis; and the rotation angle of the moving platform is $$\Delta\theta = \arccos\frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if Δθ is greater than 0, the moving platform 3 rotates clockwise; and if Δθ is less than 0, the moving platform 3 rotates counterclockwise;

Linear Grating Encoder Joint Position Feedback Step driving the linear grating encoder by the ultrasonic linear motor, feeding back the measured actual position to the computer via an incremental encoder interface of a Dspace semi-physical simulation controller, executing a joint positioning control algorithm by the computer to generate a joint control drive signal, outputting a direct-current control signal via a D/AC interface of the Dspace semi-physical simulation controller to a driver of the ultrasonic linear motor to drive the motor such that the joint moves to the expected position.

In this embodiment, the stationary platform 4 has a size of a radium of a circumscribing circle and less than or equal to 365 mm, and may be received in the cavity of a Zeiss scanning electron microscopy EVO LS 15; the moving platform 3 has a circular top and a triangle bottom, an circumscribing circle of the equilateral triangle has a radius of 28 mm and a thickness of 10 mm; the driven rod 2 has a size parameter of 95 mm×20 mm×30 mm; and all the members are made of aluminum alloy and is subjected to no surface treatment.

The CCD camera 11 is a CCD camera modeled GS3-U3-41C6C/M-C from PointGrey in Canada, which has a resolution of 2048×2048, and provides 10 μm pixel positioning precision in a 20 mm×20 mm field of view. If subpixel positioning is also employed, 1 μm positioning precision may be achieved, the frame rate is 90 fps, the transport protocol is USB3.0, and the rate is 500 mb/s. Therefore, the rate requirement of real-time feedback may be accommodated.

The linear grating encoder 5 is composed of a grating scale, a reading head and a fine interface, which are respectively: RELE grating scale, modeled RELE IN 20U 1A 0180A, 20 μm grating pitch, inconel grating scale, length 180 mm, 20 mm reference mark away from the top; reading head: modeled T161130M, TONIC series vacuum reading head, compatible with RELE grating scale, all reference marks are output, the vacuum cable length is 3 m; Ti fine interface: modeled Ti0400A01A, resolution 50 nm, linear drive output, alarm, receiver clock 1 MHz, reference mark.

The ultrasonic linear motor 1 employs U-264.30 motor from PI company in Germany, which has a stroke of 150 mm, an open loop precision of 0.1 μm, an open loop speed of 250 mm/s, a shutdown rigidity of 1.5 N/μm, a shutdown holding force of 8 N, a pulling force of 7 N (50 mm/s) and 2 N (250 mm/s), a resonant frequency of 158 kHz, a motor voltage of 200 Vpp, and an input impedance of from 40 to 80 ohms. The ultrasonic linear motor 1 is driven by using the C-872.160 driver from PI company in Germany, which supports linear ultrasonic motors from PI, point-to-point movement, slow movement and precise positioning.

Dspace semi-physical simulation controller from Germany is used, which provides a PCI interface connected to the computer, 16-bit A/D and D/AC interfaces, a voltage range of from −10 V to +10 V, a digital I/O, an incremental encoder interface, an RS232 connector, an SPI and a $I^2C$ communication interface. Matlab/Simulink RTI is used in software development for real-time simulation, and the greatest sampling time is 0.01 ms.

The computer CPU model is Core i7 4770, with a memory of 8 GB.

Obviously, the above embodiment is merely an exemplary one for illustrating the present invention, but is not intended to limit the implementation of the present invention. Persons of ordinary skills in the art may derive other modifications and variations based on the above embodiments. All embodiments of the present invention are not exhaustively listed herein. Any modification, equivalent replacement, or improvement made without departing from the spirit and principle of the present invention should fall within the protection scope of the present invention.

What is claimed:

1. A parallel platform tracking control apparatus using a visual device as a sensor, comprising a parallel platform mechanism, a CCD camera-based visual measurement system, and a position tracking feedback control apparatus;

wherein the parallel platform mechanism comprises: a stationary platform, a moving platform arranged above the stationary platform, three ultrasonic linear motors, an ultrasonic linear motor driver; the moving platform has three rotary shafts distributed uniformly in equilateral triangle at an outer edge of the moving platform; the three ultrasonic linear motors are distributed and mounted in equilateral triangle at an edge of the stationary platform; shaft ends of rotation shafts installed on the ultrasonic linear motors are connected to one of the rotary shafts of the moving platform via a driven rod; and the ultrasonic linear motors are each provided with a linear grating encoder;

one ultrasonic linear motor, one driven rod and one rotary shaft of the moving platform constitute a parallel branch;

the three ultrasonic linear motors collaboratively drive the driven rods, such that the moving platform moves to a target position;

the ultrasonic linear motors, during movement, drives the linear grating encoder to move, to detect actual positions of the ultrasonic linear motors;

a first point light source marker and a second point light source marker that are linearly distributed and configured to focus blue laser are mounted on the moving platform as visual detection features;

the CCD camera-based visual measurement system comprises: a CCD camera arranged above the moving platform, a lens mounted on an end portion of the CCD camera, a camera light source arranged on a side of the lens, a USB interface and a computer; wherein the CCD camera is connected to the computer via the USB interface;

the lens is perpendicular and opposite to the moving platform, such that a central point of the lens coincides with an origin point of the moving platform;

the position tacking feedback control apparatus comprises a Dspace semi-physical simulation controller having an incremental encoder interface module and a D/AC interface; the D/AC interface is connected to the ultrasonic linear motor driver, each of the linear grating encoders is connected to the incremental encoder interface module, the incremental encoder interface module is connected to the computer, and the computer is connected to the D/AC interface.

2. The parallel platform tracking control apparatus using a visual device as a sensor according to claim 1, wherein the CCD camera further comprises a support mechanism, wherein the support mechanism comprises a bracket having a movable joint and a magnetic base configured to fix the bracket, and the CCD camera is fixed to an end portion of the bracket.

3. A control method of a parallel platform tracking control apparatus using a visual device as a sensor as defined in claim 2, comprising the following steps:

(I) a CCD camera-based visual measurement step, comprising:

acquiring an image signal of a moving platform via photographing by the CCD camera, and transmitting the image signal to the computer via the USB interface;

upon acquiring the image signal, performing image processing by the computer, extracting features of the first point light source marker and the second point light source marker on the moving platform, and obtaining coordinates via calculation;

calculating parallel displacements Δx and Δy and a rotation angle Δθ of the moving platform according to the coordinates of the first point light source marker and the second point light source marker;

wherein the two parallel displacements Δx and Δy and the rotation angle Δθ of the moving platform are calculated using the following formulae:

assuming that a coordinate of the first point light source marker before movement is $(x_1,y_1)$ and a coordinate of the first point light source marker after movement is $(x_1',y_1')$, and a coordinate of the second point light source marker before movement is $(x_2,y_2)$ and a coordinate of the second point light source marker after movement is $(x_2',y_2')$, and assuming that the first point light source marker and the second point light source marker before movement constitute a vector $S=((x_2-x_1),(y_2-y_1))$, and the vector changes to $S'=((x_2'-x_1'),(y_2'-y_1'))$ after movement;

the displacements of the moving platform are $$\Delta x = \frac{(x_2 - x_1) - (x_2' - x_1')}{2},$$
$$\Delta y = \frac{(y_2 - y_1) - (y_2' - y_1')}{2};$$

wherein if Δx is greater than 0, the moving platform moves towards a positive direction of x-axis, and if Δx is less than 0, the moving platform moves towards a negative direction of x-axis; and if Δy is greater than 0, the moving platform moves towards a positive direction of y-axis, and if Δy is less than 0, the moving platform moves towards a negative direction of y-axis;

the rotation angle of the moving platform is $$\Delta\theta = \arccos\frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if Δθ is greater than 0, the moving platform rotates clockwise; and if Δθ is less than 0, the moving platform rotates counterclockwise;

(II) a parallel platform position tracking measurement feedback control step, comprising:

step 1: upon receiving a drive signal transmitted by the ultrasonic linear motor driver, causing, by an ultrasonic linear motor, the moving platform to move to a target position using a driven rod, wherein the moving platform has a position and gesture angle error;

step 2: driving, by the ultrasonic linear motor, the linear grating encoder to detect an actual position of joint movement, and feeding back the detected actual position to the computer via the incremental encoder interface, wherein a subtraction is made between the actual position and an expected position to produce an error signal, a control signal is produced based on the error signal by means of a corresponding position control algorithm, the control signal outputs a direct-current control signal, via the D/AC interface, to the ultrasonic linear motor driver, whereupon the ultrasonic linear motor driver drives the ultrasonic linear motor such that the moveable joint precisely moves to the expected position;

step 3: photographing by the CCD camera within each sampling cycle, and transmitting the image signal to the computer via the USB interface, whereupon the computer performs corresponding image processing, acquires coordinate information of the photographed first point light source marker and the photographed second point light source marker, and obtains the position and gesture angle error of the moving platform using the following formulae:

assuming that the coordinate of the first point light source marker before movement is $(x_1,y_1)$ and the coordinate of the first point light source marker after movement is $(x_1',y_1')$, and the coordinate of the second point light source marker before movement is $(x_2,y_2)$ and the coordinate of the second point light source marker after movement is $(x_2',y_2')$, and assuming that the first point light source marker and the second point light source marker before movement constitute the vector $S=((x_2-x_1),(y_2-y_1))$, and the vector changes to $S'=((x_2'-x_1'),(y_2'-y_1'))$ after movement;

the displacements of the moving platform are $$\Delta x = \frac{(x_2 - x_1) - (x_2' - x_1')}{2},$$
$$\Delta y = \frac{(y_2 - y_1) - (y_2' - y_1')}{2};$$

wherein if Δx is greater than 0, the moving platform moves towards a positive direction of x-axis, and if Δx is less than 0, the moving platform moves towards a negative direction of x-axis; and if Δy is greater than 0, the moving platform moves towards a positive direction of y-axis, and if Δy is less than 0, the moving platform moves towards a negative direction of y-axis;

the rotation angle of the moving platform is $$\Delta\theta = \arccos\frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if Δθ is greater than 0, the moving platform rotates clockwise; and if Δθ is less than 0, the moving platform rotates counterclockwise;

step 4: after the computer obtains the position and gesture angle error of the moving platform via calculation, rectifying a joint driving amount, wherein a joint control signal upon rectification outputs a direct-current control signal, via the D/AC interface, to the ultrasonic linear motor driver, whereupon the ultrasonic linear motor driver drives the ultrasonic linear motor such that the moving platform precisely moves to the expected position;

(III) a moving platform position and gesture angle error calculation step, comprising:

step 1: subjecting an image to an optimal threshold segmentation to obtain a binary image;
step 2: subjecting the binary image to a connected region analysis, identifying the first point light source marker and the second point light source marker according to an area feature of the connected region, and excluding interference from a small-area connected region;
step 3: obtaining a centroid coordinate of a connected region where the first point light source marker and the second point light source marker are located based on the Moment method using the following formula:
a binary bounded image function $f(x,y)$, wherein the j+k order moment is $$M_{jk} = \int_{-\infty}^{+\infty}\int_{-\infty}^{+\infty} x^j y^k f(x, y)dxdy, (j, k = 0, 1, 2 \ldots );$$

since quality distribution of the binary image is uniform, the centriod coincides with the mass center; and if a pixel position coordinate of an object in the image is $$(x_i + y_j)(i = 0, 1, \ldots n-1; j = 0, 1, \ldots m-1), x = \frac{M_{10}}{M_{00}}, y = \frac{M_{01}}{M_{00}};$$

step 4: after the coordinate information of the photographed first point light source marker and second point light source marker is acquired, calculating the position and gesture angle error of the moving platform using the following formulae:
assuming that the coordinate of the first point light source marker before movement is $(x_1, y_1)$ and the coordinate of the first point light source marker after movement is $(x_1', y_1')$, and the coordinate of the second point light source marker before movement is $(x_2, y_2)$ and the coordinate of the second point light source marker after movement is $(x_2', y_2')$, and assuming that the first point light source marker and the second point light source marker before movement constitute the vector $S=((x_2-x_1),(y_2-y_1))$, and the vector changes to $S'=((x_2'-x_1'),(y_2'-y_1'))$ after movement;
the displacements of the moving platform are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform moves towards a positive direction of x-axis, and if $\Delta x$ is less than 0, the moving platform moves towards a negative direction of x-axis; and if $\Delta y$ is greater than 0, the moving platform moves towards a positive direction of y-axis, and if $\Delta y$ is less than 0, the moving platform moves towards a negative direction of y-axis; and
the rotation angle of the moving platform is $$\Delta\theta = \arccos\frac{S \cdot S'}{|S|^2};$$

wherein $S \cdot S'=(x_2-x_1)(x_2'-x_1')+(y_2-y_1)(y_2'-y_1')$ and $|S|^2=(x_2-x_1)^2+(y_2-y_1)^2$; if $\Delta\theta$ is greater than 0, the moving platform rotates clockwise; and if $\Delta\theta$ is less than 0, the moving platform rotates counterclockwise.

4. A control method of a parallel platform tracking control apparatus using a visual device as a sensor according to claim 3, further comprising a linear grating encode joint position feedback step and a CCD camera-based visual measurement termination feedback step;
wherein the CCD camera-based visual measurement termination feedback step, comprising:
photographing by the CCD camera-based visual measurement system within each sampling cycle, and transmitting the image signal to the computer via the USB interface, whereupon the computer performs the corresponding image processing, acquires the coordinates information of the photographed first point light source marker and the photographed second point light source marker, and calculates the position and gesture angle error of the moving platform using the following formulae:
assuming that the coordinate of the first point light source marker before movement is $(x_1, y_1)$ and the coordinate of the first point light source marker after movement is $(x_1', y_1')$, and the coordinate of the second point light source marker before movement is $(x_2, y_2)$ and the coordinate of the second point light source marker after movement is $(x_2', y_2')$, and assuming that the first point light source marker and the second point light source marker before movement constitute the vector $S=((x_2-x_1),(y_2-y_1))$, and the vector changes to $S'=((x_2'-x_1'),(y_2'-y_1'))$ after movement;
the displacements of the moving platform are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform moves towards a positive direction of x-axis, and if $\Delta x$ is less than 0, the moving platform moves towards a negative direction of x-axis; and if $\Delta y$ is greater than 0, the moving platform moves towards a positive direction of y-axis, and if $\Delta y$ is less than 0, the moving platform moves towards a negative direction of y-axis; and
the rotation angle of the moving platform is $$\Delta\theta = \arccos\frac{S \cdot S'}{|S|^2};$$

wherein $S \cdot S'=(x_2-x_1)(x_2'-x_1')+(y_2-y_1)(y_2'-y_1')$ and $|S|^2=(x_2-x_1)^2+(y_2-y_1)^2$; if $\Delta\theta$ is greater than 0, the moving platform rotates clockwise; and if $\Delta\theta$ is less than 0, the moving platform rotates counterclockwise;
wherein the linear grating encoder joint position feedback step, comprising:
driving the linear grating encoder by the ultrasonic linear motor, feeding back the measured actual position to the computer via the incremental encoder interface of the Dspace semi-physical simulation controller, executing a joint positioning control algorithm by the computer to generate a joint control drive signal, outputting a direct-current control signal via the D/AC interface of the Dspace semi-physical simulation controller to the ultrasonic linear motor driver to drive the ultrasonic linear motor such that the joint moves to the expected position.

5. A control method of a parallel platform tracking control apparatus using a visual device as a sensor as defined in claim 1, comprising the following steps:
(I) a CCD camera-based visual measurement step, comprising:
acquiring an image signal of a moving platform via photographing by the CCD camera, and transmitting the image signal to the computer via the USB interface; upon acquiring the image signal, performing image processing by the computer, extracting features of the first point light source marker and the second point light source marker on the moving platform, and obtaining coordinates via calculation;
calculating parallel displacements $\Delta x$ and $\Delta y$ and a rotation angle $\Delta \theta$ of the moving platform according to the coordinates of the first point light source marker and the second point light source marker;
wherein the two parallel displacements $\Delta x$ and $\Delta y$ and the rotation angle $\Delta \theta$ of the moving platform are calculated using the following formulae:
assuming that a coordinate of the first point light source marker before movement is $(x_1, y_1)$ and a coordinate of the first point light source marker after movement is $(x_1', y_1')$, and a coordinate of the second point light source marker before movement is $(x_2, y_2)$ and a coordinate of the second point light source marker after movement is $(x_2', y_2')$, and assuming that the first point light source marker and the second point light source marker before movement constitute a vector $S=((x_2-x_1),(y_2-y_1))$, and the vector changes to $S'=((x_2'-x_1'),(y_2'-y_1'))$ after movement;
the displacements of the moving platform are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform moves towards a positive direction of x-axis, and if $\Delta x$ is less than 0, the moving platform moves towards a negative direction of x-axis; and if $\Delta y$ is greater than 0, the moving platform moves towards a positive direction of y-axis, and if $\Delta y$ is less than 0, the moving platform moves towards a negative direction of y-axis;
the rotation angle of the moving platform is $$\Delta \theta = \arccos \frac{S \cdot S'}{|S|^2};$$

wherein $S \cdot S' = (x_2-x_1)(x_2'-x_1') + (y_2-y_1)(y_2'-y_1')$ and $|S|^2 = (x_2-x_1)^2 + (y_2-y_1)^2$; if $\Delta \theta$ is greater than 0, the moving platform rotates clockwise; and if $\Delta \theta$ is less than 0, the moving platform rotates counterclockwise;
(II) a parallel platform position tracking measurement feedback control step, comprising:
step 1: upon receiving a drive signal transmitted by the ultrasonic linear motor driver, causing, by an ultrasonic linear motor, the moving platform to move to a target position using a driven rod, wherein the moving platform has a position and gesture angle error;
step 2: driving, by the ultrasonic linear motor, the linear grating encoder to detect an actual position of joint movement, and feeding back the detected actual position to the computer via the incremental encoder interface, wherein a subtraction is made between the actual position and an expected position to produce an error signal, a control signal is produced based on the error signal by means of a corresponding position control algorithm, the control signal outputs a direct-current control signal, via the D/AC interface, to the ultrasonic linear motor driver, whereupon the ultrasonic linear motor driver drives the ultrasonic linear motor such that the moveable joint precisely moves to the expected position;
step 3: photographing by the CCD camera within each sampling cycle, and transmitting the image signal to the computer via the USB interface, whereupon the computer performs corresponding image processing, acquires coordinate information of the photographed first point light source marker and the photographed second point light source marker, and obtains the position and gesture angle error of the moving platform using the following formulae:
assuming that the coordinate of the first point light source marker before movement is $(x_1, y_1)$ and the coordinate of the first point light source marker after movement is $(x_1', y_1')$, and the coordinate of the second point light source marker before movement is $(x_2, y_2)$ and the coordinate of the second point light source marker after movement is $(x_2', y_2')$, and assuming that the first point light source marker and the second point light source marker before movement constitute the vector $S=((x_2-x_1),(y_2-y_1))$, and the vector changes to $S'=((x_2'-x_1'),(y_2'-y_1'))$ after movement;
the displacements of the moving platform are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform moves towards a positive direction of x-axis, and if $\Delta x$ is less than 0, the moving platform moves towards a negative direction of x-axis; and if $\Delta y$ is greater than 0, the moving platform moves towards a positive direction of y-axis, and if $\Delta y$ is less than 0, the moving platform moves towards a negative direction of y-axis;
the rotation angle of the moving platform is $$\Delta \theta = \arccos \frac{S \cdot S'}{|S|^2};$$

wherein $S \cdot S' = (x_2-x_1)(x_2'-x_1') + (y_2-y_1)(y_2'-y_1')$ and $|S|^2 = (x_2-x_1)^2 + (y_2-y_1)^2$; if $\Delta \theta$ is greater than 0, the moving platform rotates clockwise; and if $\Delta \theta$ is less than 0, the moving platform rotates counterclockwise;
step 4: after the computer obtains the position and gesture angle error of the moving platform via calculation, rectifying a joint driving amount, wherein a joint control signal upon rectification outputs a direct-current control signal, via the D/AC interface, to the ultrasonic linear motor driver, whereupon the ultrasonic linear motor driver drives the ultrasonic linear motor such that the moving platform precisely moves to the expected position;
(III) a moving platform position and gesture angle error calculation step, comprising:
step 1: subjecting an image to an optimal threshold segmentation to obtain a binary image;

step 2: subjecting the binary image to a connected region analysis, identifying the first point light source marker and the second point light source marker according to an area feature of the connected region, and excluding interference from a small-area connected region;

step 3: obtaining a centroid coordinate of a connected region where the first point light source marker and the second point light source marker are located based on the Moment method using the following formula:

a binary bounded image function $f(x,y)$, wherein the j+k order moment is $$M_{jk} = \int_{-\infty}^{+\infty} \int_{-\infty}^{+\infty} x^j y^k f(x, y) dx dy, (j, k = 0, 1, 2 \ldots);$$

since quality distribution of the binary image is uniform, the centriod coincides with the mass center; and if a pixel position coordinate of an object in the image is $$(x_i + y_j)(i = 0, 1, \ldots n-1; j = 0, 1, \ldots m-1), x = \frac{M_{10}}{M_{00}}, y = \frac{M_{01}}{M_{00}};$$

step 4: after the coordinate information of the photographed first point light source marker and second point light source marker is acquired, calculating the position and gesture angle error of the moving platform using the following formulae:

assuming that the coordinate of the first point light source marker before movement is $(x_1,y_1)$ and the coordinate of the first point light source marker after movement is $(x_1',y_1')$, and the coordinate of the second point light source marker before movement is $(x_2,y_2)$ and the coordinate of the second point light source marker after movement is $(x_2',y_2')$, and assuming that the first point light source marker and the second point light source marker before movement constitute the vector $S=((x_2-x_1),(y_2-y_1)$ and the vector changes to $S'=((x_2'-x_1'),(y_2'-y_1')$ after movement;

the displacements of the moving platform are $$\Delta x = \frac{(x_2 - x_1) - (x_2' - x_1')}{2}, \Delta y = \frac{(y_2 - y_1) - (y_2' - y_1')}{2};$$

wherein if $\Delta x$ is greater than 0, the moving platform moves towards a positive direction of x-axis, and if $\Delta x$ is less than 0, the moving platform moves towards a negative direction of x-axis; and if $\Delta y$ is greater than 0, the moving platform moves towards a positive direction of y-axis, and if $\Delta y$ is less than 0, the moving platform moves towards a negative direction of y-axis; and the rotation angle of the moving platform is $$\Delta\theta = \arccos\frac{S \cdot S'}{|S|^2};$$

wherein $S \cdot S' = (x_2-x_1)(x_2'-x_1')+(y_2-y_1)(y_2'-y_1')$ and $|S|^2 = (x_2-x_1)^2+(y_2-y_1)^2$; if $\Delta\theta$ is greater than 0, the moving platform rotates clockwise; and if $\Delta\theta$ is less than 0, the moving platform rotates counterclockwise.

* * * * *